(Model.)
C. KIESER.
MEAT CUTTING MACHINE.
No. 260,758. Patented July 11, 1882.
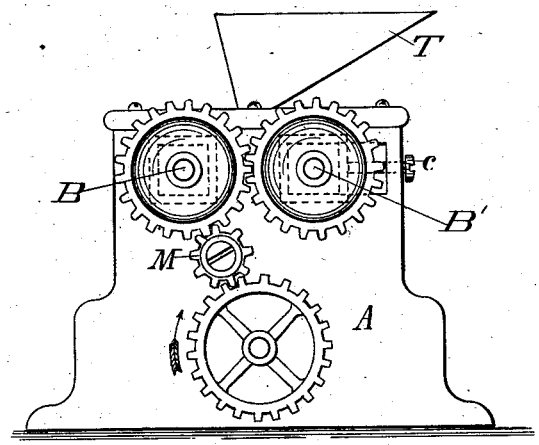
Fig. 1.
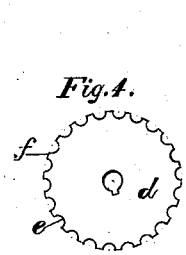
Fig. 4. Fig. 5.
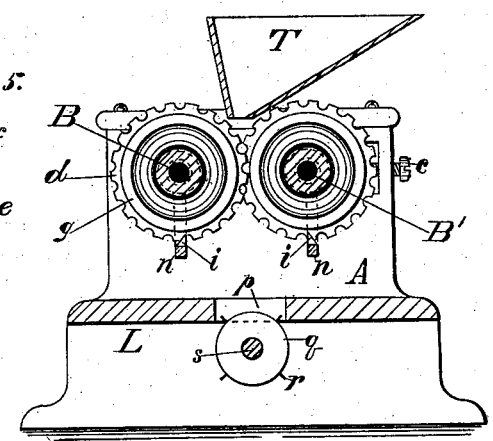
Fig. 2.
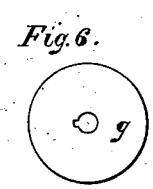
Fig. 6. Fig. 7.
Fig. 8.
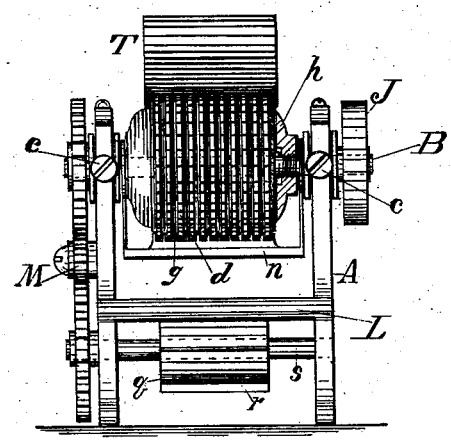
Fig. 3.
Witnesses:
Geo. A. Boyden,
A. C. Eader
Inventor:
Charles Kieser
By his Atty
R. D. Williams

UNITED STATES PATENT OFFICE.

CHARLES KIESER, OF BALTIMORE, MARYLAND.

MEAT-CUTTING MACHINE.

SPECIFICATION forming part of Letters Patent No. 260,758, dated July 11, 1882.

Application filed November 12, 1879. Renewed June 10, 1881. (Model.)

*To all whom it may concern:*

Be it known that I, CHARLES KIESER, of Baltimore city, State of Maryland, have invented certain new and useful Improvements in Machines for Cutting Meat, Tobacco, &c.; and I hereby declare the same to be fully, clearly, and exactly described as follows, reference being had to the accompanying drawings, in which—

Figure 1 is a side elevation of the machine. Fig. 2 is a similar view, partly in section. Fig. 3 is an end elevation. Figs. 4 and 5 are side elevations of one of the cutters. Figs. 6 and 7 are similar views of one of the disks, and Fig. 8 is a side elevation of the clearer or scraper.

My invention has for its object to furnish a machine for cutting meats, tobacco, &c., which shall not be liable to get out of order, and of such construction that the knives sharpen each other, as it were, in operation, and produce a true shearing cut upon the material.

In the drawings, A is the main frame of the machine, in which are journaled two parallel shafts, B B', the bearings of one of them being made adjustable by means of set-screws $c$.

On each shaft is mounted a series of cutting-disks, $d$, having teeth $e f$, and between each pair of cutters is mounted a disk, $g$, upon the shafts B B'. The cutting-disks $d$ of each series enter between those of the other, and the peripheral teeth bear upon the interposed disks.

The cutters $d$ and washers $g$ are of the same thickness, so that each cutter fits closely between a pair of the opposing series, and they are secured upon the shafts by means of nuts $h$. Exterior to the frame a gear-wheel is mounted on each shaft, which wheels are of the same size and mesh together, so that the cutters turn in opposite directions and at the same rate of speed.

Below the cutters are mounted the clearers $n$, having teeth $i$, which come between the cutters and remove the material.

L is a platform or division-board below the cutters, having an opening or slot, $p$, and below the slot is a revolving cutter consisting of a roller, $q$, having knives $r$ secured lengthwise of the roller. The latter is mounted on a shaft, $s$, and when the shaft revolves the knives $r$ pass close to the edges of the slot and shear any material that may be interposed.

A drive-pulley, J, is attached to one of the shafts B or B', or the machine may be operated by a crank, and motion is communicated to the shaft $s$ by a wheel, M, that meshes with a gear-wheel on the shaft $s$ and another on the shaft B or B'.

T is a suitable hopper. In operation, the material to be cut being placed therein and the shafts being caused to turn, the material falls on the cutters $d$ and is sheared between them into strips, which latter are severed transversely by the teeth $e f$ bearing against the rollers. For cutting "long-cut" tobacco the teeth are not permitted to touch the disks. The material falls through the slot $p$ and is again cut by the knives $r$, finally falling into a suitable receptacle.

The cut between the disks $d$ is a true shear, as the disks turn at the same rate of speed, which latter feature is of importance in lessening friction and the incident labor of working the machine.

The knives and washers are of the same thickness, and are conveniently made by stamping from a sheet of mild steel and subsequently tempering. The knives and washers being stamped from the same thickness of metal, the absolute contact of each knife with the opposite ones on either side is insured, and the form of teeth is such that they may be readily sharpened with a round or rat-tail file. The curved edges of the teeth, moreover, produce a modified form of shear as the blades revolve, differing from the simple pinch which would be produced by straight-edged teeth, as will be readily understood.

Having thus described my invention, what I claim as new, and desire to secure by Letters Patent, is—

1. The combination, substantially as set forth, of the shafts B B', each provided with a series of separate cutters having semicircular teeth and disks, all of the same thickness, and arranged to interlock, so that each cutter shall pass between a pair of the opposing series and in contact therewith, substantially as set forth.

2. In combination with the shafts B B', arranged to turn in opposite directions and at the same rate of speed, the series of cutters $d$, having semicircular teeth, and washers $g$ of the same thickness, removably secured upon the shafts and arranged to interlock, as set forth.

3. In combination with the shafts B B', arranged to turn in opposite directions and at the same rate of speed, the washers $g$ and cutters $d$, having semicircular teeth $e$, the said washers and cutters being arranged to turn in contact with each other and form a shearing cut, as set forth.

4. In combination with the shafts B B' and cutters $d$, having semicircular teeth, and washers $g$, of the same thickness as the cutters, the supplemental cutter $q\ r$, as set forth.

CHARLES KIESER.

Witnesses:
CHAS. B. MANN,
JNO. T. MADDOX.